(12) United States Patent
Park et al.

(10) Patent No.: US 10,923,274 B2
(45) Date of Patent: Feb. 16, 2021

(54) CURRENT TRANSFORMER MODULE AND POWER SUPPLY DEVICE INCLUDING THE SAME

(71) Applicant: AMOSENSE CO., LTD, Cheonan-si (KR)

(72) Inventors: Jin-Pyo Park, Seoul (KR); Won-San Na, Seoul (KR); Cheol-Seung Han, Seoul (KR)

(73) Assignee: AMOSENSE CO., LTD., Cheonan-si (KR)

( * ) Notice: Subject to any disclaimer, the term of this patent is extended or adjusted under 35 U.S.C. 154(b) by 58 days.

(21) Appl. No.: 16/322,622

(22) PCT Filed: Aug. 4, 2017

(86) PCT No.: PCT/KR2017/008440
§ 371 (c)(1),
(2) Date: Feb. 1, 2019

(87) PCT Pub. No.: WO2018/026233
PCT Pub. Date: Feb. 8, 2018

(65) Prior Publication Data
US 2019/0156998 A1 May 23, 2019

(30) Foreign Application Priority Data

Aug. 5, 2016 (KR) .......................... 10-2016-0100168

(51) Int. Cl.
*H01F 38/14* (2006.01)
*H02J 50/10* (2016.01)
(Continued)

(52) U.S. Cl.
CPC ............. *H01F 38/14* (2013.01); *H01F 27/28* (2013.01); *H01F 27/402* (2013.01);
(Continued)

(58) Field of Classification Search
CPC ....................................................... H01F 38/14
(Continued)

(56) References Cited

U.S. PATENT DOCUMENTS 5,552,978 A * 9/1996 Moncorge ................ G01R 1/20
323/223
2010/0084920 A1* 4/2010 Banting ................ H02J 50/001
307/66

(Continued)

FOREIGN PATENT DOCUMENTS

JP        2015-71413 A     4/2015
KR    2010-0111905 A   10/2010
(Continued)

*Primary Examiner* — Joseph Chang
(74) *Attorney, Agent, or Firm* — CL Intellectual LLC

(57) ABSTRACT

A power supply device includes a current transformer module capable of adjusting a power induction ratio in order to induce a certain power even when the current of a power line is changed and the current transformer module capable of minimizing the loss in power conversion while providing a certain power even when the current of the power line is changed. The disclosed current transformer module includes a magnetic core constituting a closed loop, a plurality of unit coils wound around the magnetic core, and a switch unit connected to the plurality of unit coils, and the plurality of unit coils include a plurality of unit coils for power-generation.

18 Claims, 19 Drawing Sheets

(51) Int. Cl.
*H02J 3/01* (2006.01)
*H02J 7/00* (2006.01)
*H01F 27/28* (2006.01)
*H01F 27/40* (2006.01)
*H01F 27/42* (2006.01)
*H01F 38/30* (2006.01)
*H01F 38/32* (2006.01)
*H02M 5/12* (2006.01)
*H02M 7/06* (2006.01)

(52) U.S. Cl.
CPC ........... *H01F 27/427* (2013.01); *H01F 38/30* (2013.01); *H01F 38/32* (2013.01); *H02J 3/01* (2013.01); *H02J 7/00* (2013.01); *H02J 50/10* (2016.02); *H01F 2027/408* (2013.01); *H01F 2038/305* (2013.01); *H02M 5/12* (2013.01); *H02M 7/06* (2013.01)

(58) Field of Classification Search
USPC ........................................................ 307/104
See application file for complete search history.

(56) References Cited

U.S. PATENT DOCUMENTS

2014/0021936 A1\* 1/2014 Lu ........................... H01F 38/30
323/358
2017/0199533 A1\* 7/2017 McCollough ........... G05F 1/335

FOREIGN PATENT DOCUMENTS

| KR | 10-1038254 B1 | 5/2011 |
| KR | 10-1195758 B1 | 11/2012 |
| KR | 2013-0002102 A | 1/2013 |
| KR | 2013-0133557 A | 12/2013 |

\* cited by examiner

[FIG. 1]
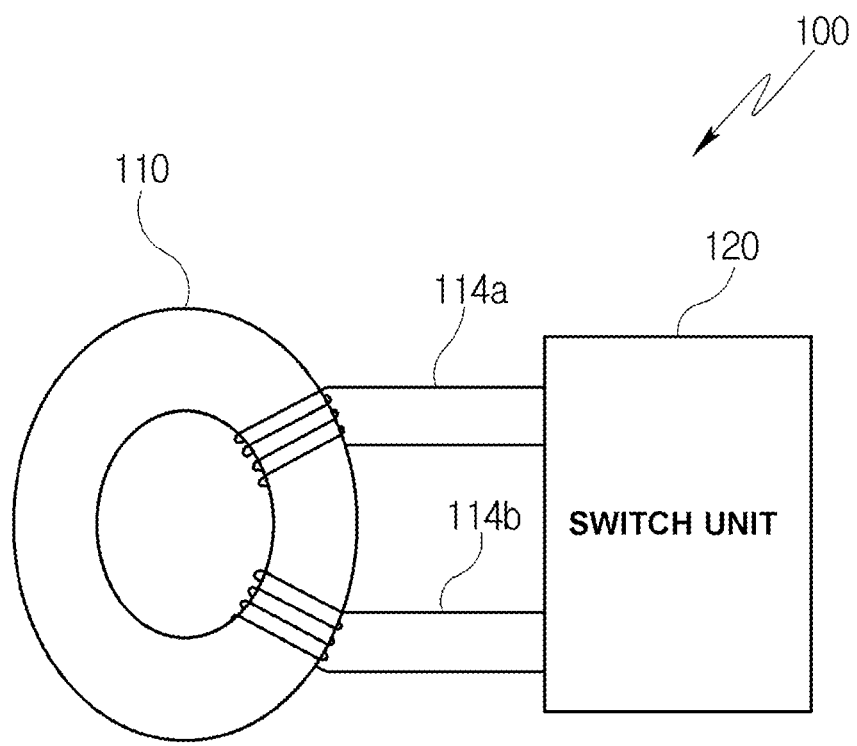

[FIG. 2]
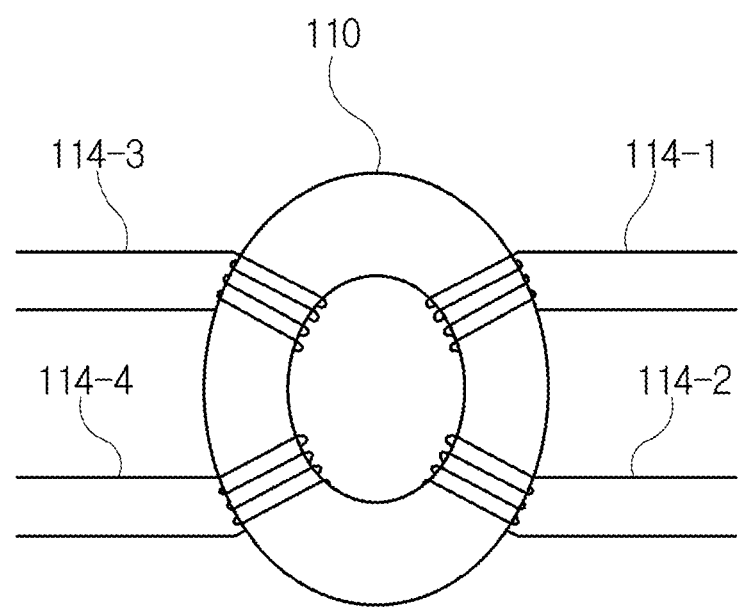

[FIG. 3]
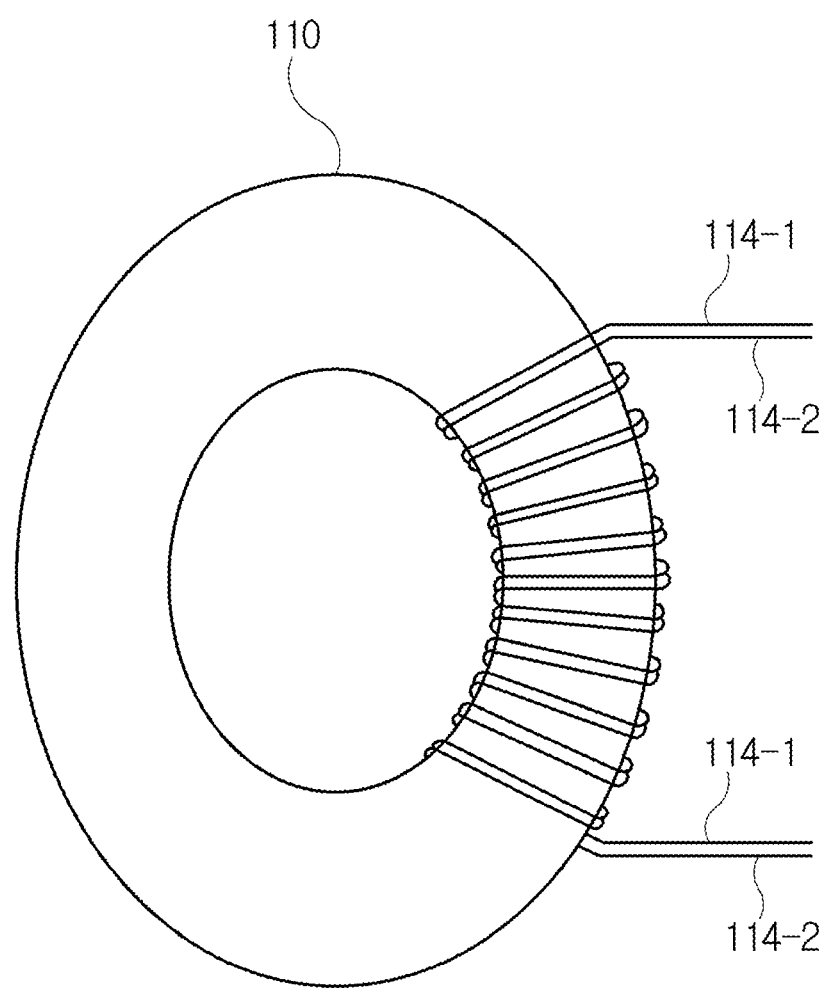

[FIG. 4]
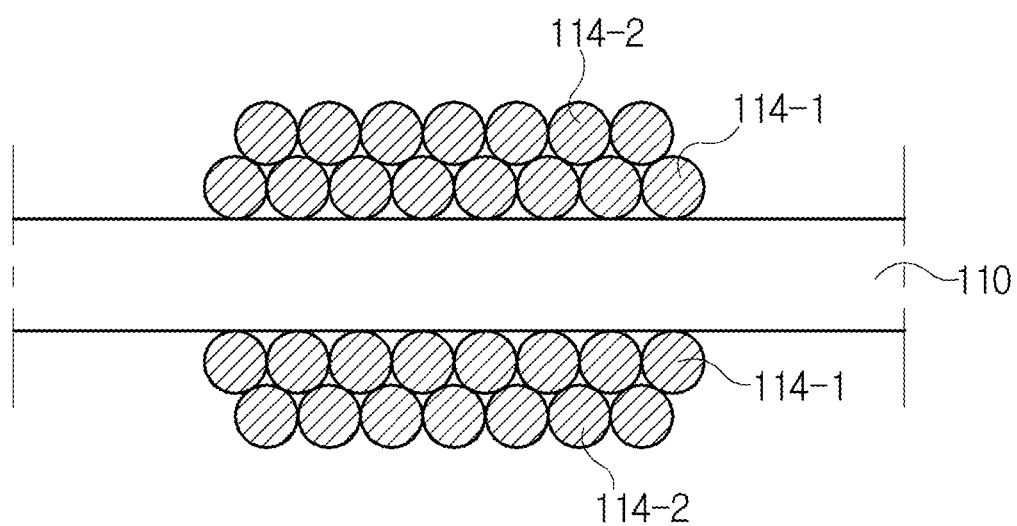

[FIG. 5]
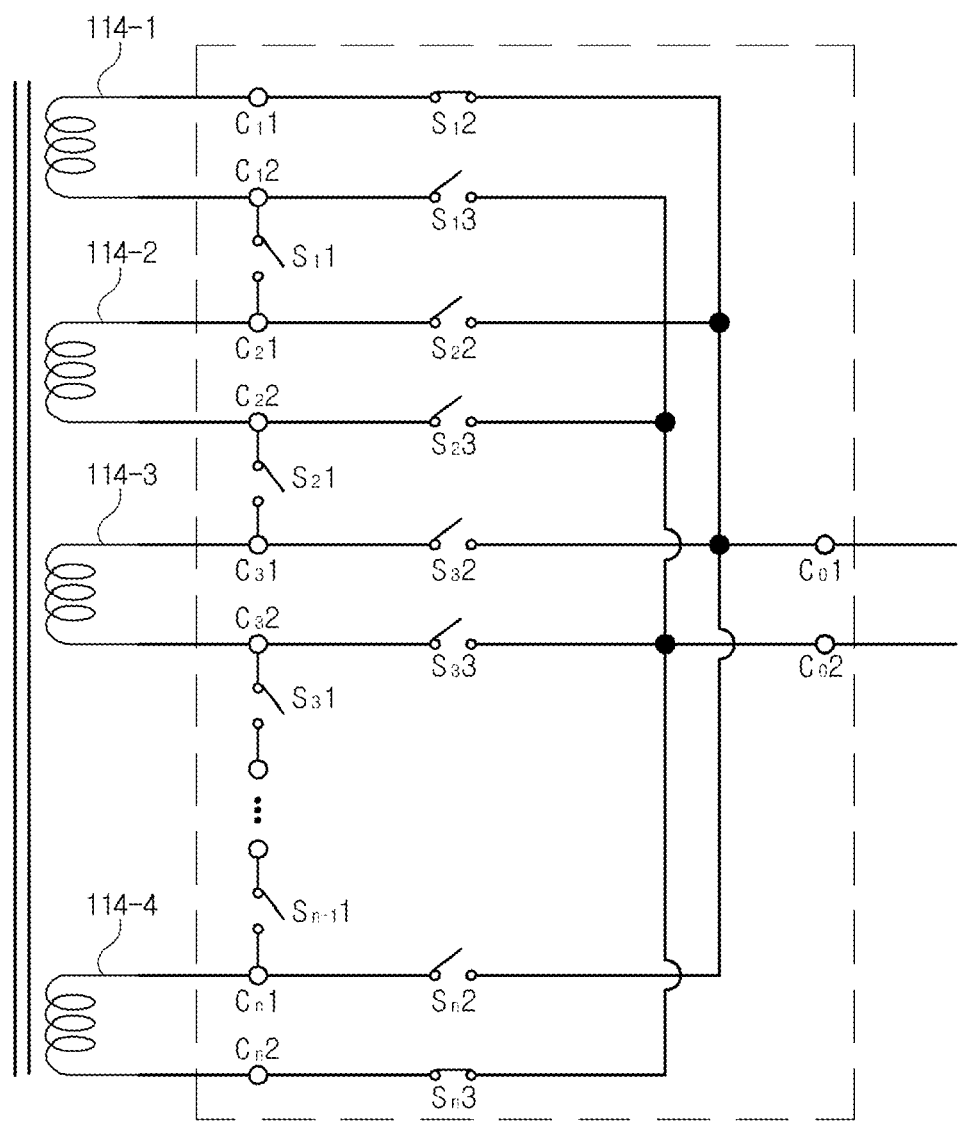

[FIG. 6]
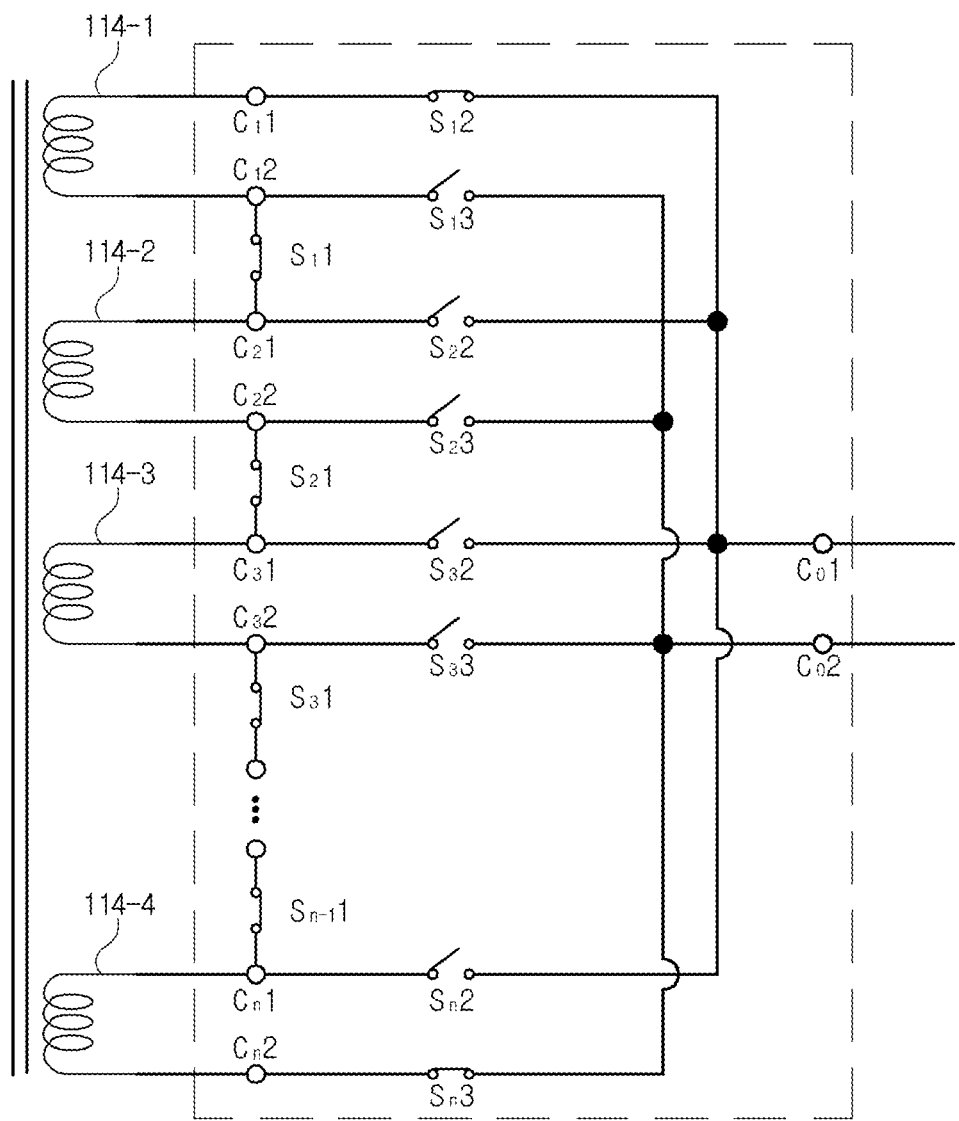

[FIG. 7]
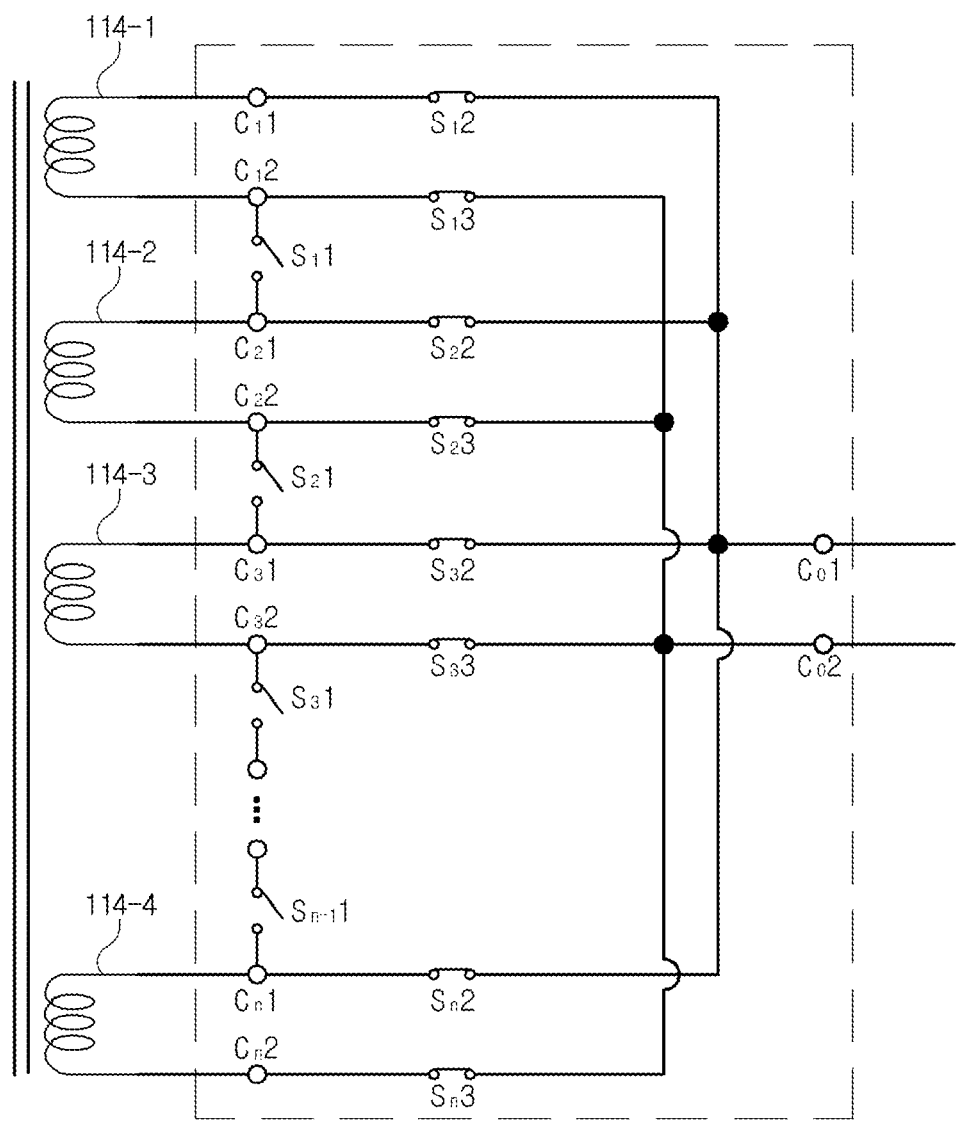

[FIG. 8]
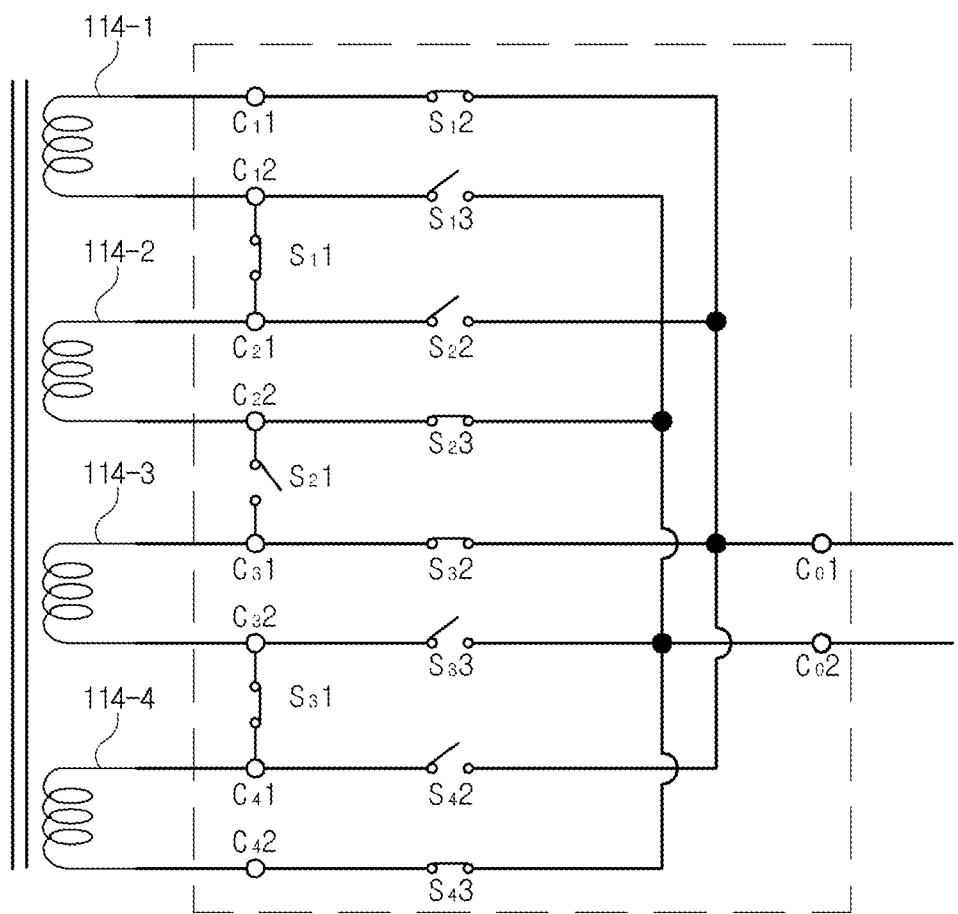

[FIG. 9]
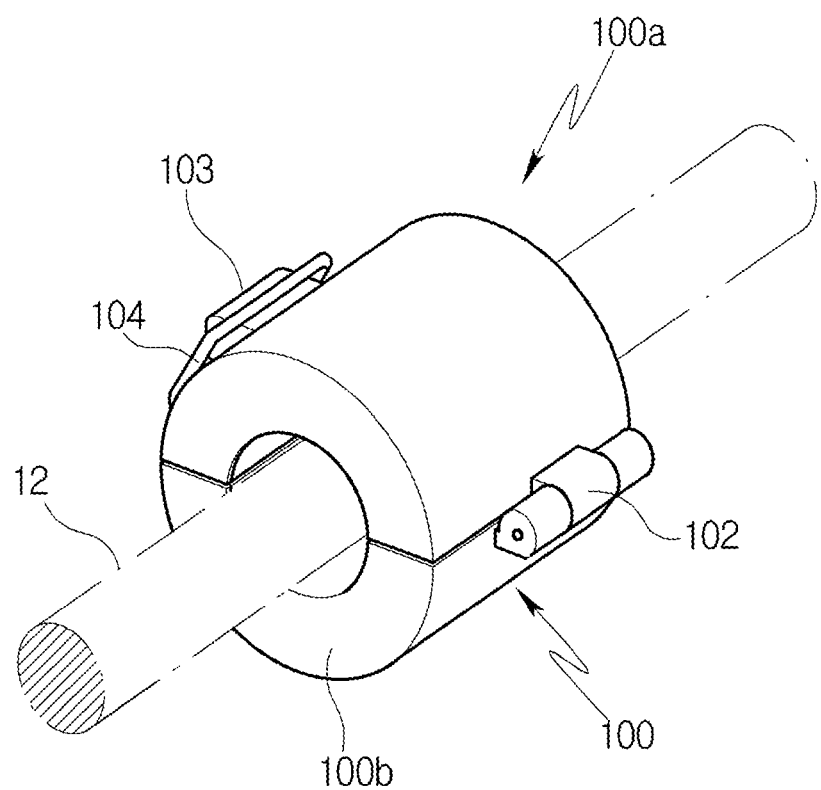

[FIG. 10]
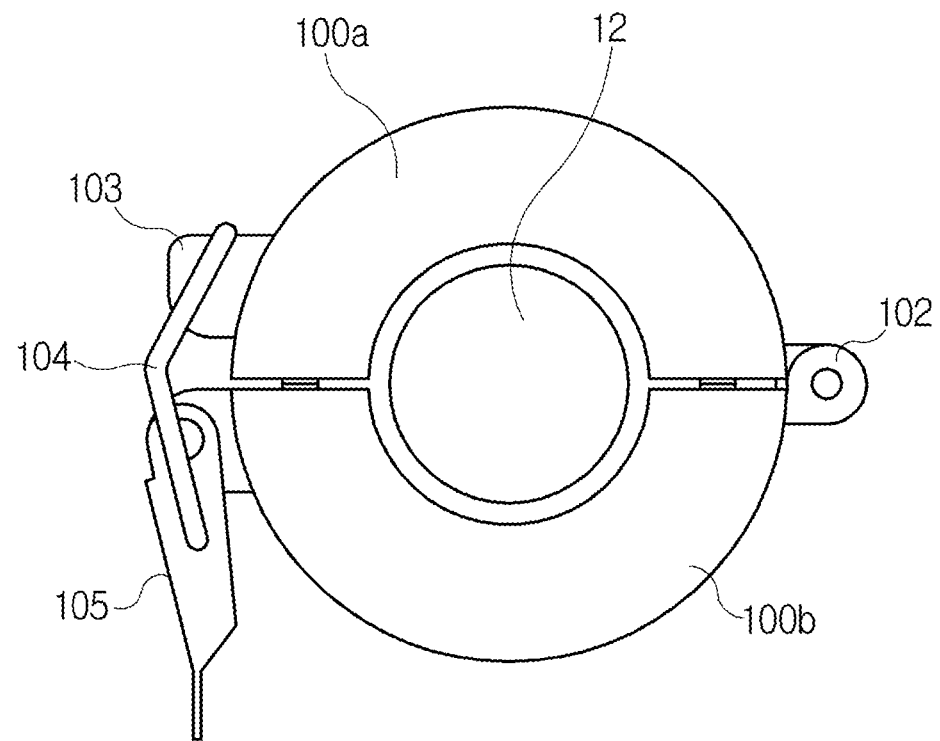

[FIG. 11]
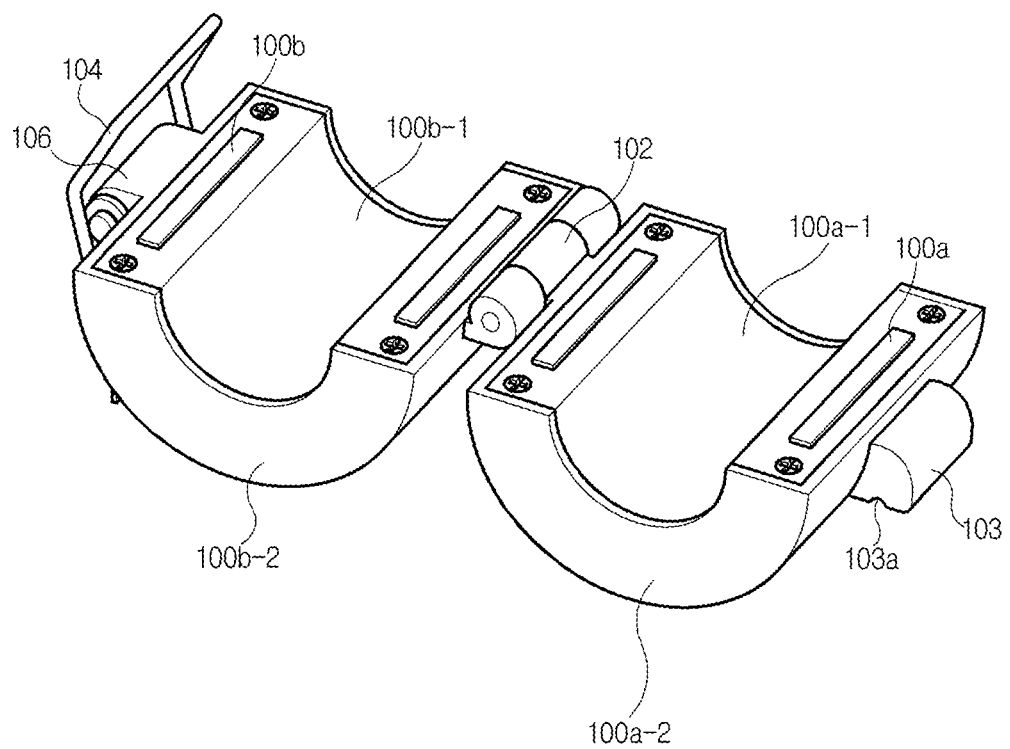

[FIG. 12]
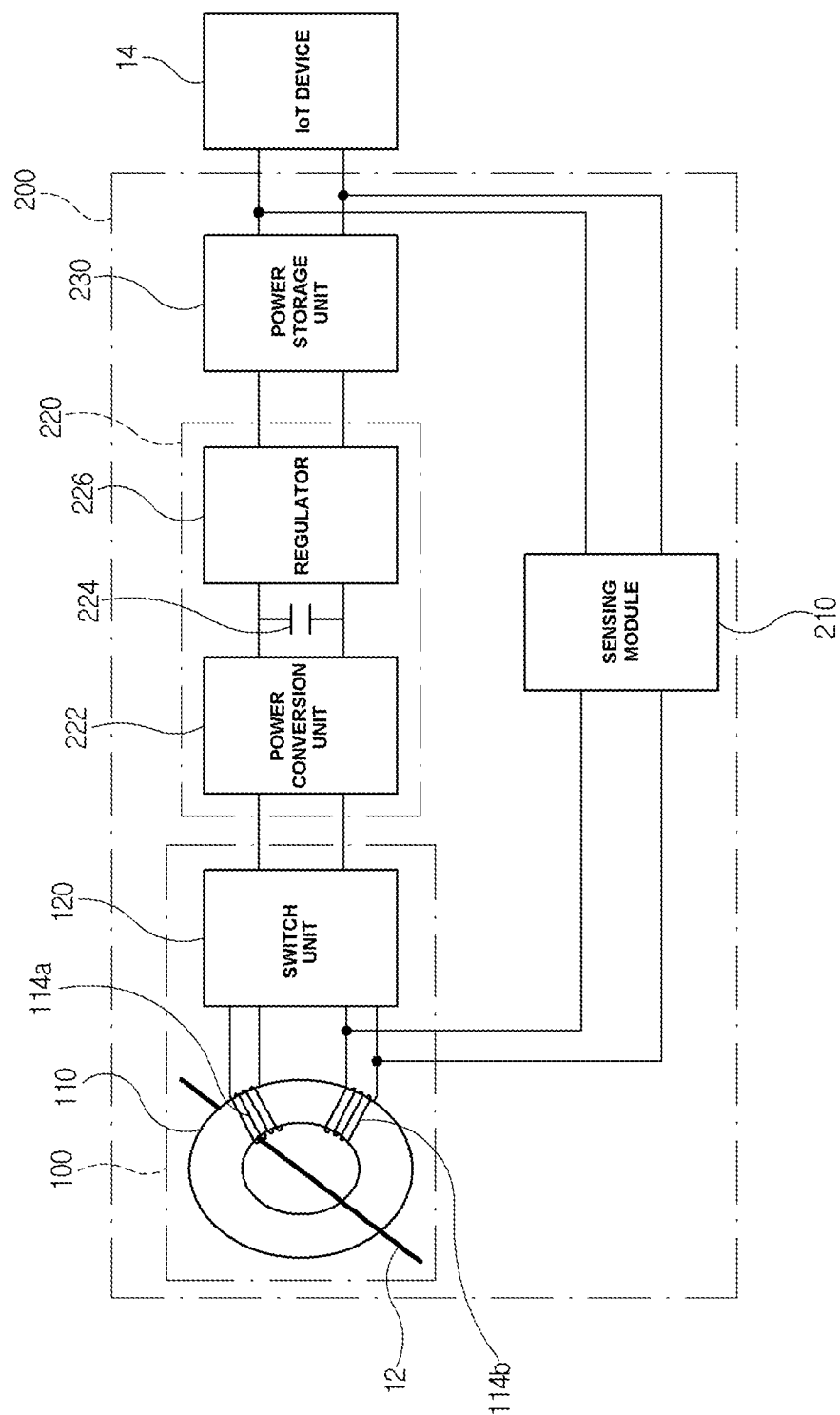

[FIG. 13]
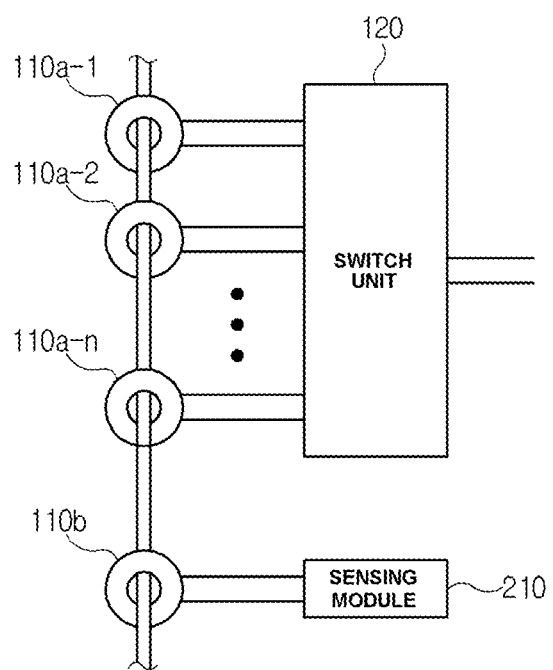

[FIG. 14]
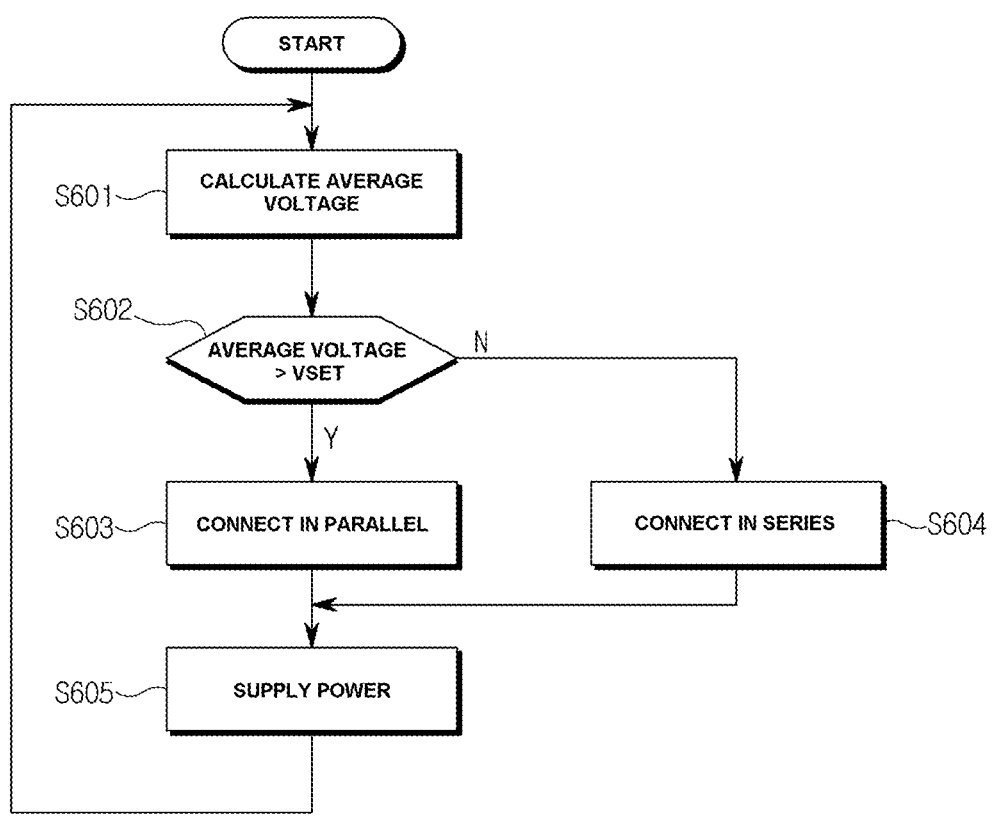

[FIG. 15]
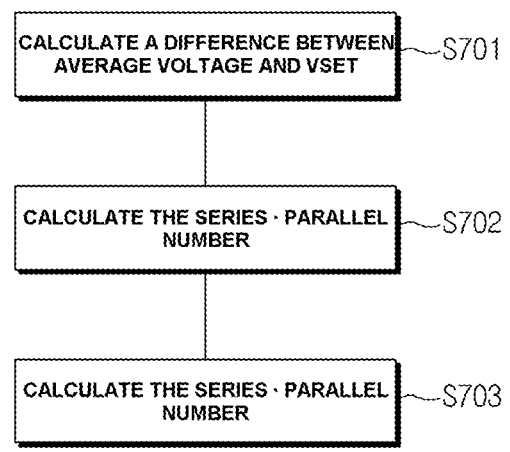

[FIG. 16]
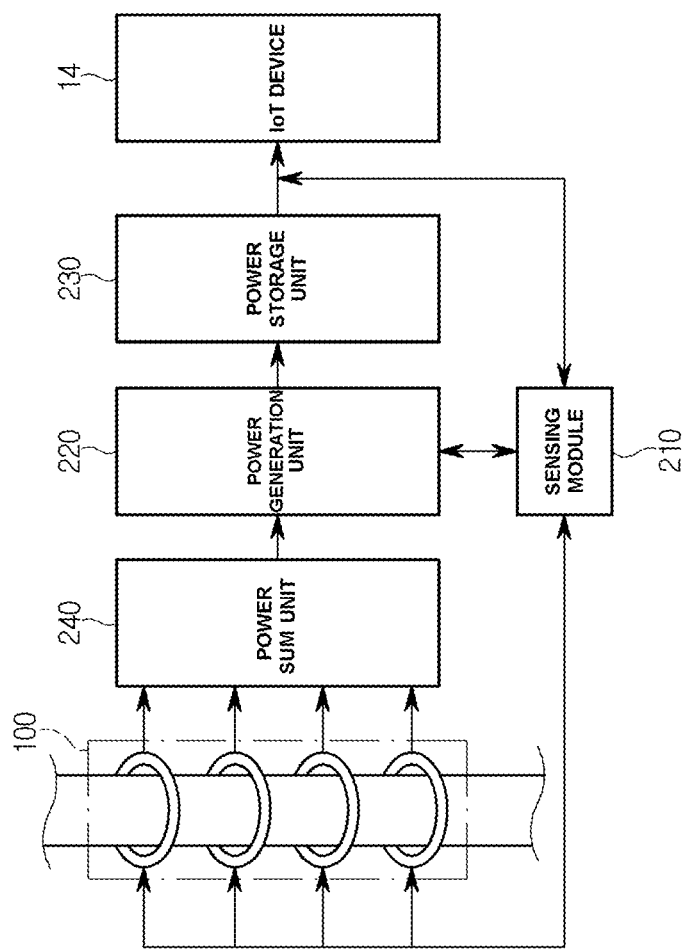

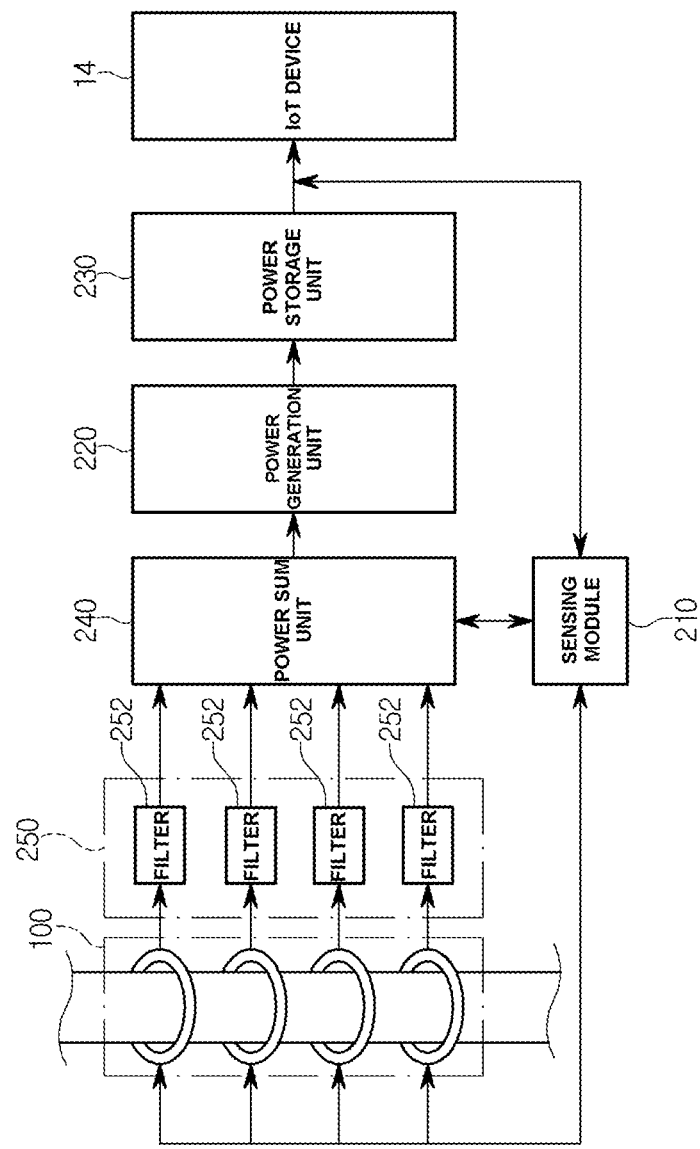
[FIG. 17]

[FIG. 18]
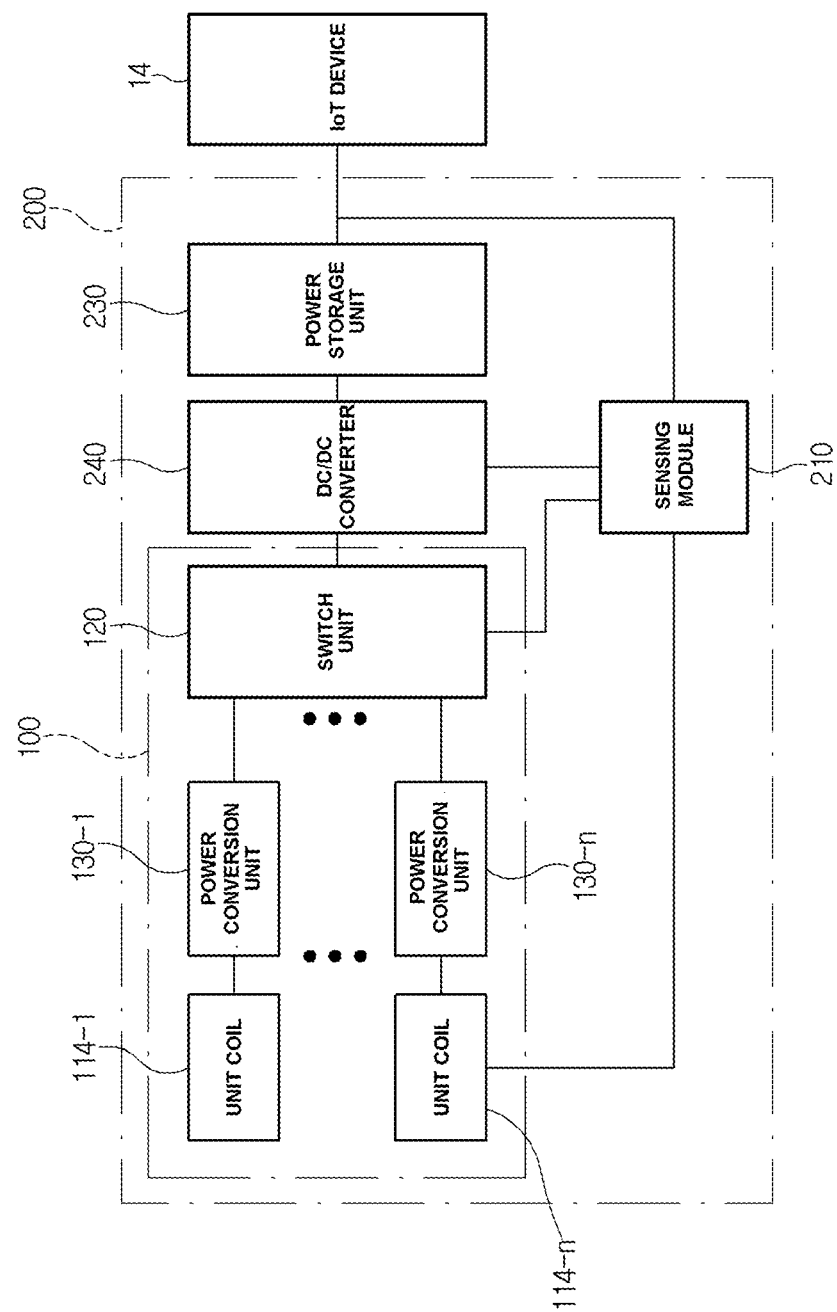

[FIG. 19]
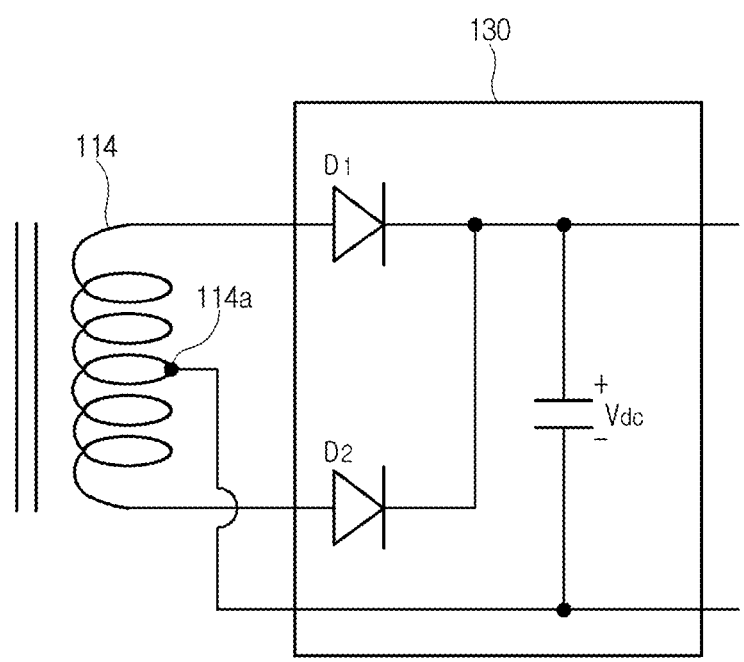

CURRENT TRANSFORMER MODULE AND POWER SUPPLY DEVICE INCLUDING THE SAME

CROSS-REFERENCE TO RELATED APPLICATIONS

This application is a National Stage of International patent application PCT/KR2017/008440, filed on Aug. 4, 2017, which claims priority to foreign Korean patent application No. 10-2016-0100168 filed on Aug. 5, 2016, the disclosures of which are incorporated by reference in their entirety.

FIELD OF THE INVENTION

The present disclosure relates to a current transformer module installed in a power line and for generating power, and a power supply device including the same, and more particularly, to a current transformer module having a structure capable of changing a winding ratio for power induction according a change in current of a power line and a power supply device including the current transformer for providing a constant output even when the current state of the power line is changed.

BACKGROUND

Recently, with the spread of Internet of Things (IoT), various types of IoT devices are emerging. These IoT devices form a specific purpose sensor network, such as a smart grid. In particular, in order to configure a network for all environments, the IoT device is installed on the exterior of a high-rise building or a basement manhole, or the like where people are not easily accessible in many cases.

In this environment, to separately install a power distribution panel or an outlet for supplying power to the IoT device is not only costly, but also considering the continuous expansion of the IoT device, the power line should be configured very complicatedly, such that a battery is generally used therefor.

However, the battery should be replaced periodically after the life time has elapsed, which increases the cost of maintenance, such as personnel input and increase in a work time for installing in a region where people are not easily accessible or replacing a large capacity of the battery of the IoT device. Therefore, there is a demand for a power supply scheme capable of minimizing maintenance for such IoT devices.

Meanwhile, a technique of supplying power by inducing power by using a current transformer (CT) detachable on the power line is being developed. As described above, the power supply device using the current transformer is regarded as an alternative to the IoT device because it may easily induce power only by attaching the current transformer to the power line.

However, in the case of inducing power from the power line, since the current state of the power line may greatly fluctuate with time, not only a constant power may not be induced, but also the power loss increases when the current of the power line is large, and the capacity of a power storage unit for supplying stable power is increased to become an obstacle to be used as a power supply device.

Therefore, there is an urgent need to develop a technique capable of easily inducing power from the power line by using the current transformer and of generating power by inducing a constant power even when the current state of the power line is changed.

SUMMARY OF THE INVENTION

The present disclosure is intended to solve the above problem, and an object of the present disclosure is to provide a current transformer module capable of adjusting a power induction ratio in order to induce a constant power even when a current of a power line is changed, and a power supply device including the current transformer module in order to minimize the loss during power conversion while providing a constant power even when a current of the power line is changed.

In addition, another object of the present disclosure is to provide a power supply device including a current transformer module for rectifying and summing (or summing and rectifying) AC power generated by a current transformer, thereby maximizing power production efficiency.

For achieving the objects, a current transformer module according to an embodiment of the present disclosure may include, as the current transformer module installed in a power line and for generating power, a magnetic core constituting a closed loop; a plurality of unit coils wound around the magnetic core; and a switch unit connected to the plurality of unit coils, and the plurality of unit coils include a plurality of unit coils for power-generation. At this time, the plurality of unit coils may include a unit coil for sensor.

The switch unit may switch so that the plurality of unit coils is connected by one of the series connection, the parallel connection, and the series-parallel combination connection. The switch unit may switch so that at least some of the plurality of unit coils for power-generation are connected in series.

The switch unit may switch so that at least some of the plurality of unit coils are connected in parallel when the voltage detected from one of the plurality of unit coils is equal to or smaller than a reference value, and the switch unit may switch so that at least some of the plurality of unit coils are connected in series when the voltage detected from one of the plurality of unit coils is smaller than a reference value. At this time, the switch unit may switch so that at least some of the plurality of unit coils are connected by one of the series connection, the parallel connection, and the series-parallel combination connection based on the difference between the voltage detected from one of the plurality of unit coils and a reference value.

The switch unit may include a plurality of first input terminals connected to one ends of the plurality of unit coils, respectively; a plurality of second input terminals connected to the other ends of the plurality of unit coils, respectively; a first output terminal; a second output terminal; a plurality of first switches for switching so that the plurality of first input terminals, and the plurality of second input terminals are connected or disconnected; a plurality of second switches for switching so that the plurality of first input terminals and the first output terminal are connected or disconnected; and a plurality of third switches for switching so that the plurality of second input terminals and the second output terminal are connected or disconnected.

At this time, each of the plurality of first switches may have one end connected to one of the plurality of first input terminals, and have the other end connected to one of the plurality of second input terminals to switch so that adjacent two unit coils among the plurality of unit coils are connected in series, each of the plurality of second switches may have one end connected to one of the plurality of first input terminals, and have the other end connected to the first output terminal, and each of the plurality of third switches may have one end connected to one of the plurality of second input terminals, and have the other end connected to the second output terminal.

A power supply device according to an embodiment of the present disclosure for achieving the objects includes a current transformer module installed in a power line, and including a plurality of unit coils; a switch unit connected to the plurality of unit coils, respectively, and for switching them; and a sensing module for controlling the switch unit so that the plurality of unit coils are connected by one of the series connection, the parallel connection, and the series-parallel combination connection based on the power induced from one of the plurality of unit coils.

The current transformer module may include a magnetic core constituting a closed loop; and a plurality of unit coils wound around the magnetic core, or include a plurality of current transformers, and the current transformer may include a magnetic core around which one unit coil is wound. At this time, for achieving the objects, the power supply device according to an embodiment of the present disclosure may further include a power sum unit for summing the AC power generated by the plurality of current transformers to output the summed AC power.

The sensing module may control the switch unit so that at least some of the plurality of unit coils are connected in parallel when the average value of the voltage induced from any one of the plurality of unit coils is equal to or greater than a reference value, or may control the switch unit so that at least some of the plurality of unit coils are connected in series when the average value of the voltage induced from any one of the plurality of unit coils is smaller than a reference value. At this time, the sensing module may control the switch unit so that the plurality of unit coils are connected by one of the series connection, the parallel connection, and the series-parallel combination connection based on the voltage induced from any one of the plurality of unit coils and a reference value, and the sensing module may set the number of unit coils connected by one of the series connection, the parallel connection, and the series-parallel combination connection based on the voltage induced from any one of the plurality of unit coils.

The switch unit may include a plurality of first input terminals connected to one ends of the plurality of unit coils, respectively; a plurality of second input terminals connected to the other ends of the plurality of unit coils, respectively; a first output terminal; a second output terminal; a plurality of first switches for switching so that the plurality of first input terminals and the plurality of second input terminals are connected or disconnected; a plurality of second switches for switching so that the plurality of first input terminals and the first output terminal are connected or disconnected; and a plurality of third switches for switching so that the plurality of second input terminals and the second output terminal are connected or disconnected.

The power supply device according to an embodiment of the present disclosure may further include a power generation unit connected to the output of the switch unit and for generating power by the voltage induced from the plurality of unit coils, and the power generation unit may include a power conversion unit for converting the output of the switch unit into DC power; and a regulator for regulating the output of the converted DC power.

For achieving the objects, the power supply device according to an embodiment of the present disclosure may further include a plurality of power conversion parts interposed between the plurality of unit coils and the switch part, and for converting the AC power induced from each of the plurality of unit coils into DC power.

Advantageous Effects

The current transformer module according to an embodiment of the present disclosure may include a plurality of unit coils in a magnetic core to switch the connection of the unit coil in series or in parallel according to a change in the current of the power line, thereby adjusting the power induction ratio according to a change in the current of the power line with time.

In addition, the current transformer module according to an embodiment of the present disclosure may adjust the ratio in order to induce a constant power even when the current of the power line is changed to reduce the complexity or the capacity of a circuit for generating and storing power at the rear end of the current transformer, thereby easily implementing an optimum system and reducing the manufacturing cost.

In addition, the power supply device including the current transformer module according to an embodiment of the present disclosure may include a plurality of current transformer modules to switch the connection of the current transformer module in series or in parallel according to the current state of the power line to adjust the power induction ratio according to a change in the current of the power line with time, thereby providing a constant power.

In addition, the power supply device including the current transformer module according to an embodiment of the present disclosure may adjusting the ratio in order to induce a constant power even when the current of the power line is changed to reduce the complexity or the capacity of the power generation unit circuit and the power storage unit at the rear end of the current transformer module, thereby easily implementing an optimum system and reducing the manufacturing cost.

In addition, the power supply device including the current transformer module according to an embodiment of the present disclosure may be configured to convert the power induced from the unit coil into DC power and then to connect it in series or in parallel, and may reduce the power consumption factor on the current path to minimize energy loss in the power induction and conversion procedure, thereby reducing the number of unit coils and the number of consumed parts while enhancing power conversion efficiency to save the manufacturing cost.

In addition, the current transformer module and the power supply device including the same according to an embodiment of the present disclosure may connect a plurality of unit coils to the power line in parallel at a time zone when a high current flows, and connect a plurality of unit coils thereto in series at a time zone when a low current flows, thereby minimizing the power loss at the high current time zone and minimizing the power storage capacity for storing power at the low current time zone to enhance the power supply efficiency.

In addition, the power supply device including the current transformer module according to an embodiment of the present disclosure may sum the AC current generated by the current transformer and then convert it into the DC power, thereby supplying the required consumption power even when the low current flows through the line. That is, the magnetic induction power supply device may couple the AC currents generated in the plurality of current transformers in parallel, thereby supplying the required consumption power even in a low input current (i.e., a current flowing through the line).

In addition, the power supply device including the current transformer module according to an embodiment of the present disclosure may sum the AC power generated through the magnetic induction in the plurality of current transformers and then convert it into DC power, thereby reducing the loss caused during rectification as compared with the related art in which the rectifying circuit is connected to each of the plurality of current transformers in one-to-one correspondence to increase the power acquisition efficiency (or power gain characteristic).

BRIEF DESCRIPTION OF THE DRAWINGS

FIGS. 1 to 11 are diagrams for explaining a current transformer module according to an embodiment of the present disclosure.

FIGS. 12 to 15 are diagrams for explaining a power supply device according to an embodiment of the present disclosure.

FIGS. 16 to 19 are diagrams for explaining the modified examples of the power supply device according to an embodiment of the present disclosure.

DETAILED DESCRIPTION

Hereinafter, the most preferred embodiment of the present disclosure will be described with reference to the accompanying drawings so that those skilled in the art to which the present disclosure pertains may easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of relevant known configurations or functions will be omitted when it is determined to obscure the subject matter of the present disclosure.

Referring to FIG. 1, a current transformer module 100 according to an embodiment of the present disclosure includes a magnetic core 110 and a plurality of unit coils 114a, 114b. Herein, the magnetic core 110 and the plurality of unit coils 114a, 114b correspond to one current transformer.

The current transformer module 100 is a module applied to a power supply device for supplying power to an IoT device, and generates power to be supplied to the IoT device by inducing power from a power line. Herein, the power line may be a power line that is exposed to the outside to be accessible, such as a power line installed in a telegraph pole or embedded in an underground.

The magnetic core 110 is configured as a pair by dividing it into two so that the current transformer module 100 may be detachably attached to the power line. At this time, a pair of magnetic cores 110 is disposed to constitute a closed loop with each other.

For example, the magnetic core 110 is formed in a pair of semicircular shapes, and is provided on an upper body 100a and a lower body 100b of the current transformer module 100, respectively (see FIG. 10). Herein, each of the pair of magnetic cores 110 has the same size, and both ends thereof contact with each other to constitute a circular closed loop.

Herein, although the magnetic core 110 has been illustrated and described as being a circular shape, it is not limited thereto, and it is not limited to the shape thereof when satisfying a condition of forming a closed loop such as a rectangular shape.

The plurality of unit coils 114a, 114b are wound around the pair of magnetic cores 110. Herein, any one unit coil 114b of the plurality of unit coils 114a, 114b is a unit coil for measurement for detecting the amount of current of the power line, and the remaining unit coil 114a is a unit coil for power-generation for generating power by inducing power from the power line.

FIG. 1 illustrates and describes that the plurality of unit coils 114a, 114b are two (i.e., the unit coil for sensor 114b and the unit coil for power-generation 114a), but the unit coil for power-generation 114a may be configured in plural.

In addition, the unit coil for power-generation 114a is configured in plural, such that a connection of the unit coils may be arbitrarily configured to adjust the induction ratio of the current transformer module 100 according to a change of the current of the power line.

Referring to FIG. 2, a plurality of unit coils 114-1 to 114-4 may be wound around the pair of magnetic cores 110 in order not to overlap each other. That is, when the plurality of unit coils 114-1 to 114-4 are wound around the magnetic core 110, they may be disposed in different regions without overlapping each other so that the winding work of each unit coil 114 is easy.

Referring to FIG. 3, at least some 114-1, 114-2 among the plurality of unit coils 114-1 to 114-4 may be wound around the magnetic core 110 to overlap in at least some regions.

For example, in the case that the plurality of unit coils 114-1 to 114-4 are disposed on the magnetic core 110, when the winding in the different regions is limited according to the specifications of the unit coil 114 and the magnetic core 110, or when the region of the magnetic core 110 is not easily divided due to an increase in the number of the unit coil 114, the unit coil 114 may be wound in at least some regions in an overlapping manner. At this time, since the surfaces of the plurality of unit coils 114 are coated with an insulating material, mutual interference does not occur. That is, a certain number of unit coils 114 may be wound in the same region.

Referring to FIG. 4, the plurality of unit coils 114-1, 114-2 may be stacked with each other and wound in the same region on the magnetic core 110. Herein, although it has been illustrated and described that the plurality of unit coils 114-1, 114-2 wound around the magnetic core 110 are two or four, the number of unit cores 114 is not particularly limited thereto.

As described above, the current transformer module 100 having the plurality of unit coils 114a, 114b formed on the pair of magnetic cores 110 may be composed of a plurality of current transformers. At this time, the current transformer has one unit coil 114 formed on the pair of magnetic cores 110, and the plurality of current transformers may have different functions (e.g., a current transformer for measurement and a current transformer for power-generation).

The current transformer module 100 may further include a switch unit 120.

The switch unit 120 may be connected to each of the plurality of unit coils 114a, 114b to switch so that the plurality of unit coils 114a, 114b are connected in series or in parallel or in a series-parallel combination.

Herein, the switch unit 120 may switch so that at least some among the plurality of unit coils 114-1 to 114-4 are connected in series or in parallel or in a series-parallel combination by a control of a sensing module, as the sensing module senses a change in the current of the power line by the voltage induced through any one coil for measurement $114b$ of the plurality of unit coils.

For example, as illustrated in FIG. 5, the switch unit 120 includes a plurality of first input terminals $C_1 1$ to $C_n 1$, a plurality of second input terminals $C_1 2$ to $C_n 2$, a first output terminal $C_O 1$, a second output terminal $C_O 2$, a plurality of first switches $S_1 1$ to $S_{n-1} 1$, a plurality of second switches $S_1 2$ to $S_n 2$, and a plurality of third switches $S_1 3$ to $S_n 3$.

The plurality of first input terminals $C_1 1$ to $C_n 1$ and the plurality of second input terminals $C_1 2$ to $C_n 2$ are connected to the plurality of unit coils 114-1 to 114-$n$, respectively. That is, the first input terminal $C_1 1$ and the second input terminal $C_1 2$ are connected to both ends of the unit coil 114-1, respectively, and the first input terminal $C_2 1$ and the second input terminal $C_2 2$ are connected to both ends of the unit coil 114-2, respectively, and in the same manner, the first input terminal $C_n 1$ and the second input terminal $C_n 2$ are connected to both ends of the unit coil 114-$n$, respectively.

The plurality of first switches $S_1 1$ to $S_{n-1} 1$ are switched (i.e., turned On or Off) to connect or disconnect the second input terminals $C_1 2$ to $C_{n-1} 2$ and the first input terminals $C_2 1$ to $C_n 1$. At this time, the plurality of first switches $S_1 1$ to $S_{n-1} 1$ operate as a switch for serially connecting the unit coils 114-1 to 114-$n$.

The plurality of second switches $S_2 2$ to $S_n 2$ are switched (i.e., turned On or Off) to connect or disconnect the first input terminals $C_1 1$ to $C_n 1$ and the first output terminal $C_O 1$. At this time, the second switch $S_1 2$ may be always kept On or omitted. As a result, one end (i.e., $C_1 1$) of the unit coil 114-1 maintains the connection state with the first output terminal $C_O 1$.

The plurality of third switches $S_1 3$ to $S_n 3$ are switched (i.e., turned On or Off) to connect or disconnect the second input terminals $C_1 2$ to $C_n 2$ and the second output terminal $C_O 2$. At this time, the third switch $S_n 3$ may be always kept On or omitted. As a result, the other end (i.e., $C_n 2$) of the unit coil 114-$n$ maintains the connection state with the second output terminal $C_O 2$.

The plurality of first switches $S_1 1$ to $S_{n-1} 1$ are turned On only partially when the unit coils 114 are connected in a series-parallel combination to connect some of the unit coils 114 in series.

For example, referring to FIG. 6, when the switch unit 120 is configured so that all the unit coils 114-1 to 114-$n$ are connected to each other in series, the plurality of first switches $S_1 1$ to $S_{n-1} 1$ are all turned On to connect the second input terminal $C_{n-1} 2$ of the unit coil 114-$n$–1 and the first input terminal $C_n 1$ of the adjacent unit coil 114-$n$. At this time, the second switches $S_2 2$ to $S_n 2$ and the third switches $S_1 3$ to $S_{n-1} 3$ are kept Off.

Therefore, the switch unit 120 connects all the unit coils 114-1 to 114-$n$ in series.

In addition, when only some among the plurality of unit coils 114-1 to 114-$n$ are connected in series, the third switch $S_n 3$ connected to the last unit coil is switched On to be connected to the second output terminal $C_O 2$.

For example, when only the upper two unit coils 114-1, 114-2 among the plurality of unit coils 114-1 to 114-$n$ are connected in series, the first switch $S_1 1$ connected to the unit coils 114-1, 114-2 and the third switch $S_2 3$ connected to the unit coil 114-2 are turned On.

Therefore, the switch unit 120 connects the first input terminal $C_1 1$ of the unit coil 114-1 to the first output terminal $C_O 1$ and connects the second input terminal $C_2 2$ of the unit coil 114-2 to the second output terminal $C_O 2$ to connect only the upper two unit coils 114-1, 114-2 in series.

The switch unit 120 may turn On or Off the plurality of second switches $S_1 2$ to $S_n 2$ and the plurality of third switches $S_1 3$ to $S_n 3$ to connect the plurality of unit coils 114-1 to 114-$n$ in parallel.

For example, referring to FIG. 7, when the switch unit 120 is configured so that the plurality of unit coils 114-1 to 114-$n$ are connected in parallel, the plurality of first switches $S_1 1$ to $S_{n-1} 1$ are all turned Off to disconnect the serial connection between the respective unit coils 114-1 to 114-$n$. The plurality of second switches $S_1 2$ to $S_n 2$ are all turned On to connect the plurality of first input terminals $C_1 1$ to $C_n 1$ to the first output terminal $C_O 1$. The plurality of third switches $S_1 3$ to $S_n 3$ are all turned On to connect the plurality of second input terminals $C_1 2$ to $C_n 2$ to the second output terminal $C_O 2$.

Therefore, the switch unit 120 connects the plurality of unit coils 114-1 to 114-$n$ in parallel.

Meanwhile, when only some among the plurality of unit coils 114-1 to 114-$n$ are connected in parallel, the switch unit 120 turns On the plurality of second switches $S_1 2$ to $S_n 2$ and the plurality of third switches $S_1 3$ to $S_n 3$ that are connected to the unit coils 114 to be connected in parallel to connect only the corresponding unit coils 114 in parallel.

For example, when only the upper two unit coils 114-1, 114-2 among the plurality of unit coils 114-1 to 114-$n$ are connected in parallel, the first switch $S_1 1$ connected to the corresponding unit coils 114-1, 114-2 are turned Off to disconnect the serial connection between the unit coils 114-1, 114-2. The second switches $S_1 2$, $S_2 2$ are turned On to connect the first input terminals $C_1 1$, $C_2 1$ to the first output terminal $C_O 1$. The third switches, $S_1 3$, $S_2 3$ are turned On to connect the second input terminals $C_1 2$, $C_2 2$ to the second output terminal $C_O 2$.

Therefore, the switch unit 120 connects the unit coils 114-1, 114-2 in parallel.

The switch unit 120 turns Off at least one among the plurality of first switches $S_1 1$ to $S_{n-1} 1$, at least one among the plurality of the second switches $S_1 2$ to $S_n 2$, and at least one among the plurality of third switches $S_1 3$ to $S_n 3$ to connect the plurality of unit coils 114-1 to 114-$n$ in series-parallel combination when the plurality of unit coils 114-1 to 114-$n$ are connected in a series-parallel combination.

For example, referring to FIG. 8, when the plurality of unit coils 114-1 to 114-4 are connected in a series-parallel combination, the first switches $S_1 1$, $S_3 1$ are turned On, and the first switch $S_2 1$ is turned. Off to connect the upper two unit coils 114-1, 114-2 and the lower two unit coils 114-3, 114-4 in series, respectively. The second switches $S_1 2$, $S_3 2$ are turned On, the second switches $S_2 2$, $S_4 2$ are turned Off, the third switches $S_2 3$, $S_4 3$ are turned On, and the third switches $S_1 3$, $S_3 3$ are turned Off to connect the two unit coil groups in parallel.

Therefore, the switch unit 120 may form m unit coil groups connected in series, and may be switched so that the m unit coil groups may be connected in parallel with each other. Herein, the number of the unit coils connected in series or in parallel is determined by the sensing module according to the current magnitude of the power line.

The current transformer module 100 thus configured is installed in the electric wire in a clamp type. For example, referring to FIGS. 9 to 11, the current transformer module 100 includes the upper body $100a$, the lower body $100b$, a hinge unit 102, and a clamp-type locking means.

The upper body $100a$ receives any one $110a$ of the pair of magnetic cores 110. For example, the upper body $100a$ includes a case $110a$-1, $110a$-2 in which a semicircular magnetic core $110a$ is received.

Herein, each of the cases 110a-1, 110a-2 is provided to have the inner surface and the outer surface of a semicircular shape, and may be coupled to each other through a fastening means. The cases 110a-1, 110a-2 may have a space for receiving the magnetic core 110a therein. At this time, the magnetic core 110a is received so that both ends thereof are exposed to the outside of the cases 110a-1, 110a-2.

The lower body 100b receives the other one 110b of the pair of magnetic cores 110. For example, the lower body 100b includes cases 110b-1, 110b-2 in which a semicircular magnetic core 110b is received.

Herein, each of the cases 110b-1, 110b-2 is provided to have the inner surface and the outer surface of a semicircular shape, and may be coupled to each other through a fastening means. The cases 110b-1, 110b-2 may have a space for receiving the magnetic core 110b therein. At this time, the magnetic core 110b is received so that both ends thereof are exposed to the outside of the cases 110b-1, 110b-2.

That is, when the upper body 100a and the lower body 100b are coupled to form a circle, as illustrated in FIG. 10, the magnetic core 110a and the magnetic core 110b may contact the exposed both ends with each other to form a closed loop.

Herein, the switch unit 120 may be embedded in any one of the upper body 100a or the lower body 100b. At this time, the upper body 100a and the lower body 100b may form a through-hole, respectively so that the plurality of unit coils 114-1 to 114-4 wound around the magnetic core 110a, 110b are connected to the switch unit 120, respectively.

For example, when the switch unit 120 is embedded in the upper body 100a, the through-hole may be provided in the case 110b-1 so that both ends of the plurality of unit coils wound around the magnetic core 110b of the lower body 100b are drawn out to the upper body 100a. At this time, the through-hole may also be provided at a position corresponding to the case 110b-1 in the case 110a-1 of the upper body 100a.

The hinge unit 102 is provided at one side of the upper body 100a and the lower body 100b to pivotally connect the upper body 100a and the lower body 100b. That is, the hinge unit 102 is provided at one side of the pair of cases 110a-1/110a-2, 110b-1/110b-2.

The clamp type locking means is provided at the other sides of the upper body 100a and the lower body 100b to fix the upper body 100a and the lower body 100b. That is, the clamp type locking means is provided at the opposite side of the hinge unit 102 in the pair of cases 110a-1/110a-2, 110b-1/110b-2.

The clamp type locking means includes a fixing unit 103 and a clamp 105.

The fixing unit 103 is provided at the opposite side of the hinge unit 102 in the upper body 100a, and a groove unit 103a for fixing the clamp 105 is formed.

The clamp 105 is provided at the opposite side of the hinge unit 102 in the lower body 100b, and is coupled to the fixing unit 103 to fix the upper body 100a and the lower body 100b. The clamp 105 includes a locking ring 104 and a pivot unit 106.

The locking ring 104 is inserted into and fixed to the groove unit 103a of the fixing unit 103. The locking ring 104 is illustrated in a rectangular shape, but is not limited thereto.

The pivot unit 106 pivotably supports the locking ring 104. The pivot unit 106 is connected with the locking ring 104 at the pivot shaft thereof so that the locking ring 104 may be pivoted.

According to such a configuration, as illustrated in FIG. 10, the current transformer module 100 may be installed so that the power line 12 is interposed between the upper body 100a and the lower body 100b.

At this time, when the locking ring 104 is inserted into and fixed to the groove unit 103a and the clamp 105 is rotated toward the lower body 100b, the locking ring 104 is pressurized downward in a state of being inserted into the groove unit 103a to couple and fix the upper body 100a and the lower body 100b in the locked state.

When the clamp 105 is rotated toward the outside of the lower body 100b in the locked state as described above, the locking ring 104 is released from the pressurized state to be released to the upside of the groove unit 103a or is allowed to flow in the groove unit 103a.

At this time, when the locking ring 104 is pivoted to the outside of the upper body 100a and the upper body 100a is pivoted upward, it is rotated through the hinge unit 102 to separate the current transformer module 100 from the power line 12.

Referring to FIG. 12, a power supply device 200 including the current transformer module according to an embodiment of the present disclosure (hereinafter referred to as a power supply device 200) supplies power to an Internet of Things device 14 (hereinafter, an IoT device 14). In particular, the power supply device 200 is for supplying power to the IoT device 14 installed in an area where it is not easy to be access. At this time, the power supply device 200 may supply power to the IoT device 14 by wire. Herein, the power line 12 is a power line 12 that is exposed to the outside to be accessible, such as the power line 12 that is installed in a telegraph pole or embedded in the underground.

For this purpose, the power supply device 200 includes the current transformer module 100 and a sensing module 210.

The current transformer module 100 is detachably installed to the power line 12, and is configured as a clamp type. That is, the current transformer-module 100 constitutes the upper and lower magnetic coils by dividing the internal magnetic core 110 into two in order to be easily detachable to the power line 12, and the plurality of unit coils 114a, 114b are wound around each of the magnetic core 110.

Herein, the unit coils 114a, 114b may be wound at different positions on the magnetic core 110, or may be wound at the same position in an overlapping manner. At this time, the surfaces of the unit coils 114a, 114b are coated with an insulating material.

As described above, the current transformer module 100 is configured by winding the plurality of unit coils 114a, 114b on the magnetic core 110. At this time, one unit coil 114b of the plurality of unit coils 114a, 114b is used for a sensor for detecting the amount of current of the power line 12, and the remaining unit coils 114a are used for power for generating power by inducing power from the power line 12.

That is, the current transformer module 100 has the plurality of unit coils 114a, 114b wound around the magnetic core 110, thereby substantially functioning as the plurality of current transformers.

Although FIG. 12 illustrates that two unit coils 114a, 114b are wound around the magnetic core 110, the unit coil 114a that is a coil for power-generation may be configured in plural.

The current transformer module 100 includes the switch unit 120 connected to each of the plurality of unit coils 114a, 114b to switch according to the sensing module 210.

The switch unit 120 includes an input terminal and a changeover switch connected to the plurality of unit coils 114a, 114b, respectively, and each changeover switch may be switched so that the plurality of unit coils 114a, 114b are connected in series, in parallel or in a series-parallel combination. At this time, the switch unit 120 is not limited thereto, and may be configured as a logic device. Herein, although it has been illustrated that the switch unit 120 has been formed integrally in the current transformer module 100, it is not limited thereto and the current transformer module 100 may be composed of the current transformer having the plurality of unit coils 114 wound around the magnetic core 110, and the switch unit 120 may be separated from the current transformer module 100 to be included in the power supply device 200.

The sensing module 210 detects the voltage induced from any one unit coil 114b of the plurality of unit coils 114-1 to 114-n to monitor the current state of the power line 12. At this time, the sensing module 210 may detect the voltage induced from the unit coil 114b, and calculate the current corresponding thereto to calculate the current of the power line 12 according to the winding ratio of the unit coil 114b.

The sensing module 210 controls the switch unit 120 so that at least some of the plurality of unit coils 114-1 to 114-n are connected in series or in parallel according to the voltage detected from the unit coil 114b. For example, when the unit coils for power-generation 114b are composed of two, the sensing module 210 controls the switch unit 120 so that one or two are selectively connected in series.

At this time, the sensing module 210 may calculate an average value for a certain time with respect to the voltage induced from the unit coil 114b, and may control the switch unit 120 so that at least some of the plurality of unit coils 114-1 to 114-n may be connected in parallel when the calculated average value is equal to or greater than a predetermined reference value. Herein, the reference value may be set to a voltage value corresponding to the magnitude of the current generated in the power line 12.

For example, when the current of the power line 12 greatly increases as the power consumption increases as in the daytime, the sensing module 210 may control the switch unit 120 so that the plurality of unit coils 114-1 to 114-n may be connected in parallel in order to minimize the power conversion loss.

In addition, when the calculated average value is smaller than the reference value, the sensing module 210 may control the switch unit 120 so that at least some of the plurality of unit coils 114-1 to 114-n is connected in series.

For example, when the current of the power reduces as the power consumption reduces as in the nighttime, the sensing module 210 may control the switch unit 120 so that the plurality of unit coils 114-1 to 114-n are connected in series in order to conserve more power.

At this time, the sensing module 210 may determine the number of the plurality of unit coils 114-1 to 114-n that are connected in series, in parallel, or in a series-parallel combination according to the magnitude of the detected voltage. That is, the sensing module 210 may control the switch unit 120 in order to configure the plurality of unit coils 114-1 to 114-n in series or in parallel in multiple stages according to a difference between the detected voltage and the reference value. Herein, the sensing module 210 may set a plurality of reference values having different sizes corresponding to the number of parallel or series or series-parallel combination configurations of the plurality of unit coils 114-1 to 114-n.

For example, in a state where a certain number of unit coils are connected in series or in parallel, the sensing module 210 may control the switch unit 120 in order to increase or decrease the number of the plurality of unit coils 114-1 to 114-n, which are configured in series or in parallel, according to a change in the current of the power line 12.

At this time, the sensing module 210 may control the switch unit 120 in order to increase or decrease the number of the series-parallel configurations of the plurality of unit coils 114-1 to 114-n, instead of increasing or decreasing only the number of series or parallel configurations according to the configuration of the multiple stages.

As described above, it is possible to configure the plurality of unit coils 114-1 to 114-n in series or in parallel in order to adjust the ratio thereof so that a constant power is induced even when the current of the power line 12 is changed, thereby reducing the complexity or the capacity of the circuit for generating or storing power of the rear end thereof to easily implement an optimum system and to reduce the manufacturing cost.

Meanwhile, as illustrated in FIG. 13, the current transformer module 100 may be composed of a plurality of current transformers. That is, each of the current transformers 110a-1, 110a-2, . . . , 110a-n, and 110b has one unit coil 114 wound around one magnetic core 110.

Herein, one current transformer 110b is connected to the sensing module 210 to monitor the current state of the power line 12, and the remaining current transformers 110a-1, 110a-2, . . . , 110a-n may be connected to the switch unit 120 to be configured in series or in parallel by the sensing module 210.

The power supply device 200 may further include a power generation unit 220 and a power storage unit 230.

The power generation unit 220 may generate power by the voltage induced from the current transformer module 100. The power generation unit 220 may be connected to the output of the switch unit 120 of the current transformer module 100, and may include a power conversion unit 222 and a regulator 226.

The power conversion unit 222 may convert the output of the current transformer module 100 into DC power. For example, the power conversion unit 222 may be a rectifying circuit composed of a bridge diode, but is not limited thereto. At this time, the power conversion unit 222 may include a smoothing circuit 224 composed of a capacitor at the output terminal thereof.

The regulator 226 may regulate so that the power converted by the power conversion unit 222 is constantly output. The regulator 226 may regulate constantly the output at a level corresponding to the power of the IoT device 14.

The power storage unit 230 may store the power generated by the power generation unit 220. The power storage unit 230 may include a super capacitor or a battery.

Herein, it is possible to configure the plurality of unit coils 114-1 to 114-n in series or in parallel according to the current state of the power line 12, thereby regulating the power induction ratio to provide a constant power even when the current of the power line 12 is changed.

In addition, it is possible for the power line 12 to connect the plurality of unit coils 114-1 to 114-n in parallel during the high current time, and to connect the plurality of unit coils 114-1 to 114-n in series during the low current time, thereby minimizing the power loss for the high current time, and minimizing the capacity of the power storage unit 230 for power storage for the low power time.

Hereinafter, an operation of the power supply device 200 according to an embodiment of the present disclosure will be described with reference to FIGS. 14 and 15.

First, the power supply device 200 monitors the current state of the power line 12 by calculating an average of the voltage induced from the unit coil 114b for the sensor S601.

Herein, the unit coil for sensor 114b may be used in common with any one of the unit coils for power-generation 114a.

The sensing module 210 determines whether the calculated average voltage is greater than a reference value Vset S602, and controls the switch unit 120 so that the plurality of unit coils 114-1 to 114-n are connected in parallel when it is determined to be greater than the reference value Vset S603.

As a result of the determination in S602, when it is determined that the average voltage is smaller than the reference value Vset, the sensing module 210 controls the switch unit 120 so that the plurality of unit coils 114-1 to 114-n are connected in series S604.

As described above, the sensing module 210 controls the switching of the switch unit 120 so that the power generation unit 220 induces and generates power from the plurality of unit coils 114-1 to 114-n, which are configured in series or in parallel, and stores it in the power storage unit 230 to supply power to the IoT device 14 S605.

Meanwhile, when the plurality of unit coils 114-1 to 114-n are connected in parallel or connected in series, the parallel or the series configuration of the plurality of unit coils 114-1 to 114-n may be gradually controlled according to the difference between the average voltage and the reference value Vset.

As illustrated in FIG. 15, first, the sensing module 210 calculates the difference between the average voltage and the reference value Vset S701.

At this time, the sensing module 210 calculates the number of the plurality of unit coils 114-1 to 114-n having a series or parallel configuration according to the difference between the average voltage and the reference value Vset S702. That is, the sensing module 210 may control so that the parallel or series number of the plurality of unit coils 114-1 to 114-n gradually increases or decreases according to the present current state of the power line 12.

Then, the sensing module 210 performs switching by controlling the switch unit 120 so that the plurality of unit coils 114-1 to 114-n are configured in parallel or in series according to the calculated number S703.

Referring to FIG. 16, the power supply device 200 according to an embodiment of the present disclosure may further include a power sum unit 240 for summing the power output from the plurality of the current transformer modules 100. That is, the power sum unit 240 sums the output powers generated by the plurality of the current transformer modules 100. At this time, the power sum unit 240 sums the AC power generated by the plurality of the current transformer modules 100 to output the summed AC power having an increased peak value to the power generation unit 220.

For example, when the present disclosure is composed of the first current transformer module 100 to the fourth current transformer module 100 and the output current of about 1 A is induced from each of the current transformer modules 100, the power sum unit 240 converts the output current of each of the current transformer module 100 into AC power, and outputs the AC power having the AC current smaller than about 4 A summing them. At this time, the output currents of the plurality of current transformer modules 100 have a phase difference according to the installation position, but the phase difference may also be neglected when they are installed adjacent to each other.

The power sum unit 240 may also sum up the output power produced by using the AC current induced from some current transformer module 100 of the plurality of current transformer modules 100 according to the required amount of power. For example, a switch is provided on the lines electrically connecting the plurality of current transformer modules 100 and the power sum unit 240, and the power sum unit 240 drives the switches according to the power (voltage) required for the IoT device 14 to output the summed AC power, which has summed only the output power generated by using the AC current induced from some current transformer module 100, to the power generation unit 220.

The summed AC power output by the power sum unit 240 is converted into DC power through the power generation unit 220 to be stored in the power storage unit 230. The power storage unit 230 supplies the stored DC power to the IoT device 14.

Therefore, the power supply device 200 converts the summed AC power summing the AC power generated by the current transformer module 100 into DC power to supply the DC power to the IoT device 14.

Referring to FIG. 17, the power supply device 200 according to an embodiment of the present disclosure may further include a filter unit 250 connected to the current transformer module 100 and the power sum unit 240. At this time, the filter unit 250 is configured to include a plurality of filters 252 installed in a line for connecting the current transformer module 100 and the power sum unit 240. The filter 252 removes noise such as Electro Magnetic Interference (EMI) from the output power output from the current transformer module 100. The filter 252 outputs the noise-removed output power to the power sum unit 240.

Referring to FIG. 18, the power supply device 200 according to an embodiment of the present disclosure may include the current transformer module 100 including a plurality of power conversion parts 130 that are interposed between the plurality of unit coils 114 and the switch unit 120 and for converting the AC power induced from the unit coil into DC power.

The power conversion unit 130 is connected to each of the plurality of unit coils 114-1 to 114-n and is configured in plural. The power conversion unit 130 converts the power induced from each of the plurality of unit coils 114-1 to 114-n into DC power. Herein, the plurality of unit coils 114 may be wound around one magnetic core 110 or may be wound around an independent magnetic core 110, respectively. When the plurality of unit coils 114 are wound around one magnetic core. 110, the switch unit 120 may be disposed in one of the current transformer module 100 or the power supply device 200. When the plurality of unit coils 114 are wound around the independent magnetic core 110, respectively, the switch unit 120 may be disposed in the power supply device 200.

At this time, the power conversion unit 130 includes only one diode on the current path in order to minimize the power loss when converting into DC power. That is, as illustrated in FIG. 19, the power conversion unit 130 may include a half bridge rectifying unit and a capacitor C.

The half bridge rectifying unit may include a first diode D1 and a second diode D2. The first diode D1 may be connected to one side of the corresponding unit coil 114, and the second diode D2 may be connected to the other side of the corresponding unit coil 114.

Herein, the first diode D1 and the second diode D2 may be connected to one side of the capacitor C, respectively, and a middle tap 114a of the corresponding unit coil 114 may be connected to the other side of the capacitor C.

At this time, when a positive voltage is induced on the corresponding unit coil 114, the voltage at the upper end of the corresponding unit coil 114 is high in the drawing, such that the capacitor C is charged according to the current path composed of the first diode D1, the capacitor C and the middle tap 114a.

Similarly, when a negative voltage is induced on the corresponding unit coil 114, the voltage at the lower end of the corresponding unit coil 114 is high in the drawing, such that the capacitor C is charged according to the current path composed of the second diode D2, the capacitor C and the middle tap 114a.

The capacitor C performs a smoothing function for the half-wave rectified power by the first diode D1 and the second diode D2 to store DC-converted power.

As described above, since in the process of converting the power induced by the corresponding unit coil 114 into the DC power, only any one diode of the first diode D1 and the second diode D2 on the current path for charging the capacitor C is included therein, the power consumption may be reduced as compared with the case of using two diodes such as the full bridge, thereby minimizing the energy loss to enhance the power conversion efficiency.

In addition, by enhancing the power conversion efficiency by the reduction in the power consumption factor, only fewer unit coils are required to provide the same power according to the state change of the power line 12, and as the power consumption factor is reduced, it is possible to reduce the number of parts, thereby saving the manufacturing cost.

The switch unit 120 is connected to each of the outputs of the plurality of power conversion parts 130-1 to 130-$n$ to switch so that the outputs of the plurality of power conversion parts 130-1 to 130-$n$ are connected in series or in parallel according to the sensing module 210.

At this time, when the average value calculated by the sensing module 210 is greater than the reference value, the switch unit 120 may switch so that at least some of the outputs of the plurality of power conversion parts 130-1 to 130-$n$ are connected in parallel.

In addition, when the average value calculated by the sensing module 210 is smaller than the reference value, the switch unit 120 may switch so that at least some of the outputs of the plurality of power conversion parts 130-1 to 130-$n$ are connected in series.

As described above, when switching so that the outputs of the plurality of power conversion parts 130 are connected in series, the switch unit 120 outputs a total Vdct of the output Vdc1 of the power conversion unit 130-1 and the output Vdc2 of the power conversion unit 130-2.

Therefore, when the current of the power line 12 decreases as in the nighttime, the outputs of the plurality of power conversion parts 130 may be connected in series to increase the total voltage in order to induce more power.

In addition, when the power conversion unit 130 is composed of n parts and only some of them are connected in series, the second switch provided at the first input terminal may be switched to be connected to the first output terminal $C_O1$, and the second switch provided at the last input terminal may be switched to be connected to the second output terminal $C_02$.

In addition, when the switch unit 120 switches so that the outputs of the plurality of power conversion parts 130 are connected in parallel, the second switch $S_n2$ provided at the first input terminal $C_n1$ may be switched to be connected to the first output terminal $C_O1$, and the third switch $S_n3$ provided at the second input terminal $C_n2$ may be switched to be connected to the second output terminal $C_o2$.

As described above, when the switch unit 120 switches so that the outputs of the plurality of power conversion parts 130 are connected in parallel, the total voltage Vdct is the same as the output Vdc1 of the power conversion unit 130-1 or the output Vdc2 of the power conversion unit 130-2.

Therefore, when the current of the power line 12 increases as in the daytime, the outputs of the plurality of power conversion parts 130 may be connected in parallel to maintain the entire voltage in a low state in order to minimize the power loss.

In addition, when the power conversion unit 130 is composed of n parts and only some of them are connected in parallel, the second switch $S_n2$ and the third switch $S_n3$ provided at the first input terminal $C_n1$ connected to the power conversion unit 130 configuring the parallel connection are switched to be connected to the first output terminal $C_o1$ and the second output terminal $C_o2$, respectively, and the second switch and the third switch provided at the input terminal connected to the power conversion unit 130 that does not configure the remaining parallel connection may be kept in an Off state.

At this time, when the switch unit 120 is configured so that the outputs of the plurality of power conversion parts 130-1 to 130-$n$ are connected in a series-parallel combination, the outputs of the m power conversion parts 130 may be connected in series, respectively, and as described above, the output groups of the m power conversion parts 130 connected in series may be switched so that a plurality of output groups are connected in parallel with each other. Herein, the number of the unit coils 114 connected in series or in parallel is determined by the sensing module 210 according to the magnitude of the current of the power line 12.

The sensing module 210 detects the voltage induced from any one unit coil 114$n$ of the plurality of unit coils 114-1 to 114-$n$ to monitor the current state of the power line 12. At this time, the sensing module 210 may detect the voltage induced from the unit coil 114$n$, and calculate the current corresponding thereto to calculate the current of the power line 12 according to the winding ratio of the unit coil 114$n$.

The sensing module 210 controls the switch unit 120 so that at least some of the outputs of the plurality of power conversion parts 130-1 to 130-$n$ are connected in series or in parallel according to the voltage detected from the unit coil 114$n$.

In addition, the corresponding unit coil 114 may convert it into DC power and then the switch unit 120 may configure the converted DC power in parallel or in series or in a series-parallel combination, thereby further alleviating the circuit complexity of the switch unit 120 and a DC/DC converter 240 and the power storage unit 230 at the rear end thereof.

As described above, the power supply device 200 may further include the DC/DC converter 240 and the power storage unit 230.

The DC/DC converter 240 converts the output of the switch unit 120 to a certain level. That is, the DC/DC converter 240 converts the DC output of the switch unit 120 into a level corresponding to the power of the IoT device 14. The DC/DC converter 240 may be a buck converter.

The power storage unit 230 may store the power generated by the DC/DC converter 240. The power storage unit 230 may include a super capacitor or a battery.

Herein, by configuring the outputs of the plurality of power conversion parts 130-1 to 130-$n$ in series or in parallel according to the current state of the power line 12, it is possible to adjust the power induction ratio, thereby providing a certain power even when the current of the power line is changed.

In addition, it is possible for the power line to connect the outputs of the plurality of power conversion parts 130-1 to 130-n in parallel during the high current time, and to connect the outputs of the plurality of power conversion parts 130-1 to 130-n in series during the low current time, thereby minimizing the power loss for the high current time and minimizing the capacity of the power storage unit 230 for power storage for the low power time.

Explaining an operation of the power supply device 200 thus configured, first, the sensing module 210 calculates the average of the voltage induced from the unit coil for sensor 114n to monitor the current state of the power line 12.

The sensing module 210 determines whether the calculated average voltage is greater than the reference value Vset, and when it is determined to be greater than the reference value Vset, the sensing module 210 controls the switch unit 120 so that the outputs of the plurality of power conversion parts 130-1 to 130-n are connected in parallel.

As a result of the determination, when it is determined that the average voltage is smaller than the reference value Vset, the sensing module 210 controls the switch unit 120 so that the outputs of the plurality of power conversion parts 130-1 to 130-n are connected in series.

As described above, the sensing module 210 controls the switching of the switch unit 120 to generate a certain power from the outputs of the plurality of power conversion parts 130-1 to 130-n which are configured in series or in parallel, and stores it in the power storage unit 230 to supply power to the IoT device 14.

Meanwhile, when the outputs of the plurality of power conversion parts 130-1 to 130-n are connected in parallel or in series, the parallel or series configuration of the outputs of the plurality of power conversion parts 130-1 to 130-n may be gradually controlled according to the difference between the average voltage and the reference value Vset.

For example; the sensing module 210 calculates the difference between the average voltage and the reference value Vset. At this time, the sensing module 210 calculates the number of outputs of the plurality of power conversion parts 130-1 to 130-n having a series or parallel configuration according to the difference between the average voltage and the reference value Vset. That is, the sensing module 210 may control so that the parallel or series number of the plurality of unit coils 114-1 to 114-n increases or decreases gradually according to the present current state of the power line 12.

Then, the sensing module 210 performs switching by controlling the switch unit 120 so that the outputs of the plurality of power conversion parts 130-1 to 130-n are configured in parallel or in series according to the calculated number.

As described above, although preferred embodiments according to the present disclosure have been described, it is to be understood that they may be modified into various forms, and various modifications and changes thereof may be embodied by those skilled in the art without departing from the scope of the present disclosure.

The invention claimed is:

1. A current transformer module, comprising:
   in the current transformer module installed in a power line and for generating power,
   a magnetic core constituting a closed loop;
   a plurality of unit coils wound around the magnetic core; and
   a switch unit connected to the plurality of unit coils,
   wherein the plurality of unit coils comprises a plurality of unit coils for power-generation, and
   wherein the switch unit switches so that at least some of the plurality of unit coils for power-generation are connected in series.

2. The current transformer module of claim 1, wherein the plurality of unit coils comprises a unit coil for sensor.

3. The current transformer module of claim 1, wherein the switch unit switches so that the plurality of unit coils are connected by one of the series connection and the series-parallel combination connection.

4. The current transformer module of claim 1, wherein, the switch unit switches so that at least some of the plurality of unit coils are connected in parallel when the voltage detected from one of the plurality of unit coils is equal to or smaller than a reference value.

5. The current transformer module of claim 1, wherein the switch unit switches so that at least some of the plurality of unit coils are connected in series when the voltage detected from one of the plurality of unit coils is smaller than a reference value.

6. The current transformer module of claim 1, wherein the switch unit comprises
   a plurality of first input terminals connected to one ends of the plurality of unit, coils, respectively;
   a plurality of second input terminals connected to the other ends of the plurality of unit coils, respectively;
   a first output terminal;
   a second output terminal;
   a plurality of first switches for switching so that the plurality of first input terminals and the plurality of second input terminals are connected or disconnected;
   a plurality of second switches for switching so that the plurality of first input terminals and the first output terminal are connected or disconnected; and
   a plurality of third switches, for switching so that the plurality of second input terminals and the second output terminal are connected or disconnected.

7. The current transformer module of claim 6, wherein each of the plurality of first switches has one end connected to one of the plurality of first input terminals, and has the other end connected to one of the plurality of second input terminals to switch so that adjacent two unit coils among the plurality of unit coils are connected in series,
   wherein each of the plurality of second switches has one end connected to one of the plurality of first input terminals, and has the other end connected to the first output terminal, and
   wherein each of the plurality of third switches has one end connected to one of the plurality of second input terminals, and has the other end connected to the second output terminal.

8. A current transformer module, comprising:
   in the current transformer module installed in a power line and for generating power,
   a magnetic core constituting a closed loop;
   a plurality of unit coils wound around the magnetic core; and
   a switch unit connected to the plurality of unit coils,
   wherein the plurality of unit coils comprises a plurality of unit coils for power-generation, and
   wherein the switch unit switches so that at least some of the plurality of unit coils are connected by one of the series connection, the parallel connection, and the series-parallel combination connection based on the difference between the voltage detected from one of the plurality of unit coils and a reference value.

9. A power supply device, comprising:
- a current transformer module installed in a power line, and comprising a plurality of unit coils;
- a switch unit connected to the plurality of unit coils, respectively, and for switching them; and
- a sensing module for controlling the switch unit so that the plurality of unit coils is connected by one of the series connection, the parallel connection, and the series-parallel combination connection based on the power induced from one of the plurality of unit coils,
- wherein the sensing module controls the switch unit so that at least some of the plurality of unit coils are connected in series when the average value of the voltage induced from any one of the plurality of unit coils is smaller than a reference value.

10. The power supply device of claim 9, wherein the current transformer module comprises
- a magnetic core constituting a closed loop; and
- a plurality of unit coils wound around the magnetic core.

11. The power supply device of claim 9, wherein the current transformer module comprises a plurality of current transformers, and wherein, the current transformer comprises a magnetic core around which one unit coil is wound.

12. The power supply device of claim 11, farther comprising a power sum unit for summing the AC power generated by the plurality of current transformers to output the summed AC power.

13. The power supply device of claim 9, wherein the sensing module controls the switch unit so that at least some of the plurality of unit coils are connected in parallel when the average value of the voltage induced from any one of the plurality of unit coils is equal to or greater than a reference value.

14. The power supply device of claim 9, wherein the sensing module controls the switch unit so that the plurality of unit coils is connected by one of the series connection, the parallel connection, and the series-parallel combination connection based on the voltage induced from any one of the plurality of unit coils and a reference value.

15. The power supply device of claim 9, wherein the sensing module sets the number of unit coils connected by one of the series connection, the parallel connection, and the series-parallel combination connection based on the voltage induced from any one of the plurality of unit coils.

16. The power supply device of claim 9, wherein the switch unit comprises
- a plurality of first input terminals connected to one ends of the plurality of unit coils, respectively;
- a plurality of second input terminals connected to the other ends of the plurality of unit coils, respectively;
- a first output terminal;
- a second output terminal;
- a plurality of first switches for switching so that the plurality of first input terminals and the plurality of second input terminals are connected or disconnected;
- a plurality of second switches for switching so that the plurality of first input terminals and the first output terminal are connected or disconnected; and
- a plurality of third switches for switching so that the plurality of second input terminals and the second output terminal are connected or disconnected.

17. The power supply device of claim 9, further comprising a power generation unit connected to the output of the switch unit and for generating power by the voltage induced from the plurality of unit coils,
- wherein the power generation unit comprises
- a power conversion unit for converting the output of the switch unit into DC power; and
- a regulator for regulating the output of the converted DC power.

18. The power supply device of claim 9, further comprising a plurality of power conversion parts interposed between the plurality of unit coils and the switch part, and for converting the AC power induced from each of the plurality of unit coils into DC power.

* * * * *